United States Patent [19]

Hannaht

[11] 4,297,409
[45] Oct. 27, 1981

[54] MANUFACTURE OF ARTICLES FROM AN ORGANIC MATERIAL AND A WATER-HARDENABLE MASS

[75] Inventor: David J. Hannaht, Great Bookham, England

[73] Assignee: University of Surrey, Surrey, England; a part interest

[21] Appl. No.: 92,416

[22] Filed: Nov. 6, 1979

Related U.S. Application Data

[63] Continuation-in-part of Ser. No. 30,428, Apr. 16, 1979, abandoned, which is a continuation-in-part of Ser. No. 809,394, Jun. 23, 1977, abandoned.

[30] Foreign Application Priority Data

Jul. 1, 1976 [GB] United Kingdom .............. 27371/76

[51] Int. Cl.³ ................................................ B32B 7/00
[52] U.S. Cl. .................................... 428/247; 264/136; 264/257; 264/258; 264/333; 264/DIG. 47; 428/252; 428/255; 428/265; 428/310; 428/910; 428/294; 428/224

[58] Field of Search ................. 428/85, 245, 260, 265, 428/310 HC, 910, 247, 252, 255; 264/136, 137, DIG. 47, 122, 257, 258, 333

[56] References Cited

U.S. PATENT DOCUMENTS 3,591,395  7/1971  Zonsveld et al. ..................... 106/99
4,242,407  12/1980  Byen .................................... 428/288

Primary Examiner—James J. Bell

[57] ABSTRACT

A material primarily for replacing asbestos-cement products includes a reinforcing network of continuous, fibrillated organic film and a water-hardened mass such as Portland cement and sand or alternatively gypsum. The organic film may be a polyolefin such as polypropylene or high modulus polyethylene. The reinforcement may be incorporated as a woven or non-woven network.

A process for making such a material is also described.

The material has, in some respects, superior properties in relation to those of asbestos-cement.

33 Claims, 11 Drawing Figures

MANUFACTURE OF ARTICLES FROM AN ORGANIC MATERIAL AND A WATER-HARDENABLE MASS

This application is a continuation-in-part application based on continuation-in-part application 30,428 filed Apr. 16, 1979 now abandoned which is itself a continuation-in-part application of original application 809,394 filed June 23, 1977 now abandoned.

This invention relates to articles made from a water-hardening mass, for example a cement mortar or a gypsum-based material.

It has been known for many years that asbestos and in particular "blue" asbestos presents a health hazard both to the workers involved in mining the mineral and to users, particularly when the user is required to manipulate by cutting or sawing articles incorporating asbestos fibres.

In the building industry asbestos-cement sheets and other products such as pipes and rain water goods have been commonly used owing to their cheapness and weathering properties where low load conditions are encountered. Once installed, it is unlikely that the asbestos content of such products will have any noticeable adverse effect on persons using the building, but up to the installation stage it has now been shown that the risks to the persons physically handling asbestos-containing goods is far from negligible.

Numerous alternatives are available to asbestos-cement articles including traditional building materials but all of these have the disadvantage either of being intrinsically more costly or requiring greater labour costs at the installation or in some cases the transportation stage.

It follows from this background that many attempts have been made to provide a substitute for products based on asbestos-cement mixes but the proposals so far put forward have the disadvantages either that they are too expensive when compared with asbestos-cement and/or have inferior properties.

In British Patent Specification No. 1,130,612 it has been proposed to incorporate in a water-hardenable mass, defined as a mixture consisting wholly or mainly of one or more inorganic materials with water, which mixture is capable of setting to a solid coherent mass, up to only 2% by weight of short fibres formed from a stretched and then fibrillated film. This specification further proposes that the film should be a polyolefin film and in particular a polypropylene film. The fibres proposed in this prior specification have a length no greater than 7.5 cm, and thin sheets made from mixes containing such fibres would be unsatisfactory for most purposes.

It has also been proposed in British Patent Specification No. 1,429,167 to provide a fibre-reinforced composite incorporating a physically united pre-combination of absorbent fibres and reinforcing fibres selected from fibres of glass, steel, carbon, boron, copper, brass, aluminium and its alloys, asbestos and silicon compounds, non-absorbent polyamides, non-absorbent polyesters, non-absorbent polyacrylics, polyolefins and polyurethanes. Further this prior specification proposes that the pre-combination can include pre-woven tapes, cloth or mesh.

The actual examples described in this specification refer only to steel wires and glass fibre as the reinforcing filaments, and these, in combination with the absorbent fibres, give acceptable strength properties. However, the pre-combination requirement of reinforcing fibres and absorbent fibres necessitates an additional process step and results in a costly material in order to achieve the aim of this previous proposal. The fact that asbestos is mentioned as a possible reinforcing fibre indicates that the prior proposal was not intended to provide a substitute for asbestos-cement sheets but was intended to improve the strength properties of such sheets.

An object of the present invention is to provide an alternative to asbestos-cement products which is competitive with asbestos-cement products.

A further object of the present invention is to provide a material which has at least in some respects improved properties in relation to asbestos-cement.

According to the present invention there is provided a process for the manufacture of articles comprising the steps of providing a network of continuous fibrillated organic film and incorporating the network in a water-hardening mass.

By the use of a continuous fibrillated organic film incorporated as a network in a water-hardening mass, it becomes possible to manufacture articles which have properties which at least in some respects are substantially superior to those of for example asbestos-cement, and which can be competitive in cost.

Preferably, the volume of film comprises more than $1\frac{1}{2}\%$ by volume of the article, with at least about 2% by volume of the article being advantageous. It is even more advantageous to use at least about 5% by volume of the article.

The network used in the process may be based on fibrillated polyolefin film since this gives particularly good properties at a cost which is currently competitive with conventional asbestos fibres. By incorporating one of these polyolefins as reinforcing material, namely polypropylene or high modulus polyethylene, it becomes possible by incorporating a large number of layers per centimeter thickness of the product, to obtain a final product which has adequate strength properties for the production of cement-based sheets so that the process produces an end product which is not only competitive in price with asbestos-cement but has properties which enable its use in many situations where asbestos-cement cannot be used.

Some earlier attempts to develop an alternative to asbestos as a reinforcing material have relied on the use of a reinforcement having a Young's Modulus which is higher than from that of the matrix. Examples of such reinforcements are steel rods and wires. It was the general scientific view that to provide effective reinforcement it was necessary that the modulus should be at least equal to the modulus of the matrix and typically in an article entitled "Fibre composites as construction materials" appearing in the Journal "Composites" for March 1972, J. A. G. Thomas stated that "... polypropylene cannot improve the flexural strength of concrete since its Young's modulus is about 8 gn/m2 compared with 32 gn/m2 for the cement matrix". Another active worker in the field, J. J. Zonsveld in a paper published about September 1975; "The Concrete/Polypropylene fibre composite has little added strength compared with the same concrete without fibre. Although the tensile strength of polypropylene is much higher than that of concrete, the modulus of elasticity is so much lower, that under increasing stress the concrete will reach its ultimate deformation and will start cracking well before the fibre can develop a constraining stress".

Applicant has been one of the first to appreciate in the field of water-hardening mass composites that theoretically the need for the reinforcement to have a modulus higher than, or approximately equal to that of the matrix is not necessary provided that the reinforcement is in an appropriate form inter alia to achieve mechanical bonding and enable comparatively large volumes of reinforcement to be incorporated. Further in order to be viable technically and in practice, it is necessary that the overall cost shall be comparable with inexpensive, presently readily available, materials such as asbestos cement.

While the Applicant has shown in the examples given hereinafter that polypropylene (modulus about 5 gn/m2) will provide viable and technically acceptable composites provided it has the appropriate form, fibrillated, high modulus, polyethylene film can give better characteristics, since the modulus in the post-cracked condition is higher than that of current polypropylene although still only approximately one third of the modulus of the matrix. Applicant has shown that the critical modulus for the reinforcement is that applicable after the matrix has cracked and not the modulus of the reinforcement applicable while the matrix itself is still bearing the load. Thus, even if currently available high modulus polyethylene film had been available when previous workers in the fibre-reinforced composite art were considering organic materials as reinforcements. It would have been rejected because the relevant modulus was appreciably lower than that of the matrix.

The realisation that the low modulus of organic materials in relation to the modulus of the matrix was unimportant would not, in itself, have led to a successful composite material since it is essential to take other factors into account, such as bonding between the matrix and the reinforcement. Previous proposals for alternative organic reinforcements have recognized the difficulties of bonding water-hardening substances such as cement and gypsum and, in general, costly methods have been proposed to overcome the bonding problem by adding other materials such as described in British Patent Specification No. 1,429,167, hereinbefore referred to.

By use of an organic film which will fibrillate, the problem of bonding is overcome in a simple way without recourse to costly bonding materials or to special treatment of the matrix. As discussed herein the bonding achieved is a combination of frictional and mechanical bonding which avoids risk of possibly harmful, long-term, chemical interaction between the matrix and the reinforcement.

The use of an organic film, as opposed to a round monofilament, as previously proposed, is also important because by this means a larger volume of reinforcement can be incorporated and such larger volume can be in the form of a larger number of individual layers, thereby increasing the number of fibrils providing mechanical locking points.

Finally, in the consideration of the fundamental features of the invention, the use of networks in the form of layers as opposed to previous proposals where short lengths of fibres were employed, is important in that under post-cracking conditions the fibres cannot pull out of the matrix. The use of steel networks in the reinforcement of concrete is commonplace as used in ferro-cement shells and boats, but in the sphere of past proposals for reinforcing thin sheet water-hardened substances as alternatives to asbestos cement short length fibres have been primarily concerned and Applicant has been the first to appreciate that the network must be arranged as a plurality of layers, preferably continuous over the area of the article, in order to provide effective reinforcement in the post-cracked condition, the use of higher modulus reinforcement, but still well below that of the matrix, further improved properties in the composite can be obtained with high modulus fibrillated polyethylene details of which are given in British Patent Specification 1469526 in the names of I. M. Ward and G. Capaccio.

In the unfibrillated form typical Young's moduli for the polyethylene films are $$E_{f1} = 28.1 \text{ GN/m}^2 \text{ and } E_{f2} = 11.2 \text{ GN/m}^2.$$

It is necessary for films of the kind in question to express the Young's modulus in this way since it differs appreciably in the initial and final stress/strain regions. $E_{f1}$ applies to the initial strain range and $E_{f2}$ applies in the secondary strain range. For polypropylene these values are of the order of 3 to 10 GN/m$^2$ for $E_{f1}$ and 1 to 5 GN/m$^2$ for $E_{f2}$.

Composites based on the polyethylene reinforcement have greater stiffness for a given volume of reinforcement and the tensile strength may be increased in relation to polypropylene. It follows, that although probably somewhat more costly than the fibrillated polypropylene networks, a smaller percentage volume can be used with compensating reduction in cost. The volume percentage may be as low as 1% to obtain a useful product. The test results indicate that sheets incorporating high modulus polyethylene will be better able to withstand the flexural stresses required in Standards Specifications without visible cracking when incorporated as roofing. Another advantage of high modulus polyethylene films compared with polypropylene films is that they accept the matrix more easily than does the polypropylene and hence the maximum volume which can be included is likely to be greater than for polypropylene. This is of importance when very high performance composites are required.

For certain purposes it may be desirable to provide between two spaced layers of water-hardening mass and network, at least one inter-layer of a water-hardening mass or other material without any reinforcement.

According to the present invention there is also provided a sheet comprising a network of continuous fibrillated organic film embedded in a water-hardened mass.

The term "water-hardening mass" is intended to mean herein a dry or substantially dry mixture of one or more inorganic materials which when mixed with water sets to a solid, rigid mass. Portland cement and gypsum are examples of such a mass.

The term "continuous" in relation to a fibrillated organic film is intended primarily to describe a situation in which the individual elements forming a network extend over a major dimension of an article incorporating the network such as the breadth or the length or both the breadth and the length. More generally the term means that the network cannot be mixed with the water-hardening mass in a rotary mixer. This contrasts with reinforced materials based on a water-hardening mass in which the reinforcement is of loose short fibre which can be mixed to obtain homogeneity in a rotary mixer. Film which is capable of achieving satisfactory results will be of such a length that if subjected to rotary mixing, instead of producing a homogenous product, the film would form a tangled mass largely separate from the water-hardening mass. Also the film cannot be sprayed from a gun with water-hardening mass as with sprayed fibre cements and concretes.

The invention is not based on the water-absorption of the incorporated organic film but does not exclude such materials. For example when applied to polypropylene the water absorption is effectively nil in a humid atmosphere. After immersion in water for 24 hours the absorption was found to be below 0.10% under conditions laid down by the American Society for Testing and Materials—Report D 570-63.

The incorporation of the film may be assisted by a dispersing agent which defloculates and assists the suspension of particles of the water-hardening material and assists the penetration through the mesh to interlock the components firmly together. Generally such dispersing agents which are suitable for the purpose consist of sulphonated polymeric materials such as low molecular weight resin, sulphonated melamine formaldehyde or sulphonated naphthalene formaldehyde resin.

A dispersing agent is not, however, essential, the strength of the material depending on the mechanical interlock and on the very large surface area of the network for a given volume which controls cracking in the water-hardening mass.

Preferably a multiplicity of impregnated layers of mesh made from a network of continuous fibrillated organic film are incorporated and are pressed, trowelled or vibrated together in layers each generally less than 5 mm thick and successive layers are added until the required overall thickness for the product is achieved.

The network is preferably derived from polyolefin film which has been stretched to promote orientation of the molecular structure which gives high tensile strength and also increases the modulus of elasticity. In the presently used industrial applications of polypropylene film the stretching process produces an elongation in the polypropylene film of five to twenty times the unstretched length.

Alternatively, the film can be produced by fibrillar crystallisation.

After the stretching or crystallisation process, the film is in a state of imminent fibrillation and can become fibrillated during further handling or by suitable mechanical treatment, for example, by pin rolling in a manner similar to that employed on polypropylene film used as the raw material of binder twine.

The mesh produced can be described as a flat opened network of non-woven polyolefin film in which the elements are made from the film as opposed to monofilaments. The term "flat" should not, however, be interpreted to mean that the network is necessarily "plane" in the finished product although before incorporation it will normally be so flexible that it will conform to a plane surface when laid on one.

The mesh which forms the reinforcement can, alternatively, be a weave, known sometimes as leno weave, in which the warp is doubled so that at each intersection the weft passes over one warp of the doubled warp and beneath the other warp of the doubled warp. The two warps are then twisted before the next weft again passes in the same manner between the two warps. This has the advantage of forming a mesh which retains its shape when handled in industrial equipment and the use of the doubled weft assists in mechanical bonding between the water-hardening mass and the networks. While the woven fibre network has advantages from the viewpoint of manufacture, it has the disadvantage of being more costly and probably requires a greater volume of material to achieve equivalent properties. The warp and weft of the leno weave are, like the non-woven networks, formed from flat fibrillated, but not expanded, polypropylene.

The preferred reinforcement hereinbefore referred to is, however, the "expanded" non-woven mesh produced by mechanical fibrillation in a regular pattern, of a stretched film as illustrated in FIG. 1. One advantage of this non-woven form network, in addition to its greatly reduced cost, is that it can be made from very thin films and thus it becomes possible to increase the specific surface area of the material and to incorporate many more layers of reinforcement in a given thickness of finished sheet for a given volume of reinforcement material. The thickness of the film may range from 1 to 1000 microns, but the preference is for thinner films in the 15 to 150 micron range. The selection of the thickness depends, however, on the volume of network to be incorporated and hence the properties desired in the final product. The use of fibrillated organic thin film enables a very good mechanical interlock to be attained between the mass and the network, which it is believed gives rise to the useful properties achieved. This results in the desirable features of a reduced crack spacing and reduced crack width under post-cracking conditions in the product. Among the polyolefins, polypropylene and high modulus polyethylene are preferred but polyamides have suitable properties and can be fibrillated to provide either woven or non-woven networks.

The water-hardening mass is preferably conventional Portland cement with a filler such as very fine sand and/or pulverized fuel ash and the fineness is important since otherwise there will not be adequate penetration between the network and the mass with resulting voids and weakness. The fineness of the filler becomes particularly important when a very large number of layers of network are incorporated and the grain size will be selected to take into account the number of layers of the reinforcement network.

The composite may also contain additives in the form of short staple fibres which, among other effects, improve the surface finish of the product.

Such additives do not however form part of the fibrillated organic film network, and will normally be distributed above and below that network.

Preferably, in a sheet which is to replace a conventional average thickness, asbestos-cement sheet, at least six or seven layers of mesh will be employed comprising about 5–10% of the volume of the sheet but higher strengths can be attained by increasing the number of mesh layers and, indeed, when continuous networks made from very thin film are used as a starting material the number of mesh layers can be increased to several hundred, and, within limits, the impact strength and area under the load deflection curve in flexure and the area under the stress/strain curve in tension can be improved well beyond that attainable with asbestos-cement. It is believed that for polypropylene the upper limit is of the order of 15% by volume of film to the volume of the composite made from the film and water-hardenable mass. For high modulus polyethylene for reasons hereinbefore explained the amount can be even higher.

It will normally be desirable in sheets which are to be symmetrically corrugated in the manner of asbestos-cement sheets for most of the layers of the mesh to be orientated in the same direction with respect to the corrugations but for other uses it may be preferable to arrange the mesh layers with alternate orientations or even different orientations through the thickness of the sheet, not necessarily at right angles to one another. Where the direction of application of a tensile load can be predicted for an article in use, it is, of course preferable to align most of the fibrillated elements in that direction.

During the manufacture of the sheets it is desirable that after a certain number of layers of water-hardening mass and reinforcement have been deposited, pressure should be applied to encourage and promote mechanical bonding between the mass and the fibrillated elements, and in addition, surplus water may be removed by applying vacuum through a filter mat as in many processes in concrete production.

Many articles can be formed other than simple sheets. Multiple layers of network can in fact be wrapped round formers to produce desired special shapes.

Reference will now be made to Examples of articles embodying the invention and these Examples will refer to the accompanying drawings, in which.

EXAMPLE 1

Figure 1:
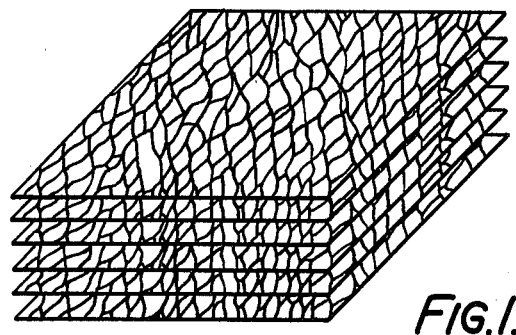
FIG. 1 is an exploded isometric view of a sheet embodying the invention and showing several continuous fibrillated film networks of non-woven form.

A specimen to be loaded in flexure was manufactured by the method in accordance with the invention and contained 6% of the total volume of the specimen of continuous flat networks of expanded stretched fibrillated polypropylene film of thickness about 100 microns. The following proportions by weight were chosen for the water-hardening mass; cement 1.0; total water 0.34; pulverized fuel ash 0.25; fine sand passing 600 micron sieve 0.19; and dispersing agent (sulphonated melamine formaldehyde resin) 0.03.

The specimen was rectangular with dimensions 13.5 mm $\times$ 50 mm $\times$ 150 mm. Tests over a span of 135 mm were carried out and the results are illustrated in the graph of load in kN against deflection in mm. of FIG. 2. The considerable post-cracking ductility was made possible by interlocking of the continuous network with the cement matrix and carrying load, without pulling out, after cracking of the matrix had occurred.

The load was removed at a deflection of about 6 mm. and the deflection recovered to within 1½ mm. of the initial zero. No cracks were readily visible to the naked eye on the tensile face of the beam after the load was removed but inspection with a microscope revealed very fine cracks between 1 mm. and 3 mm. spacing.

Figure 2:
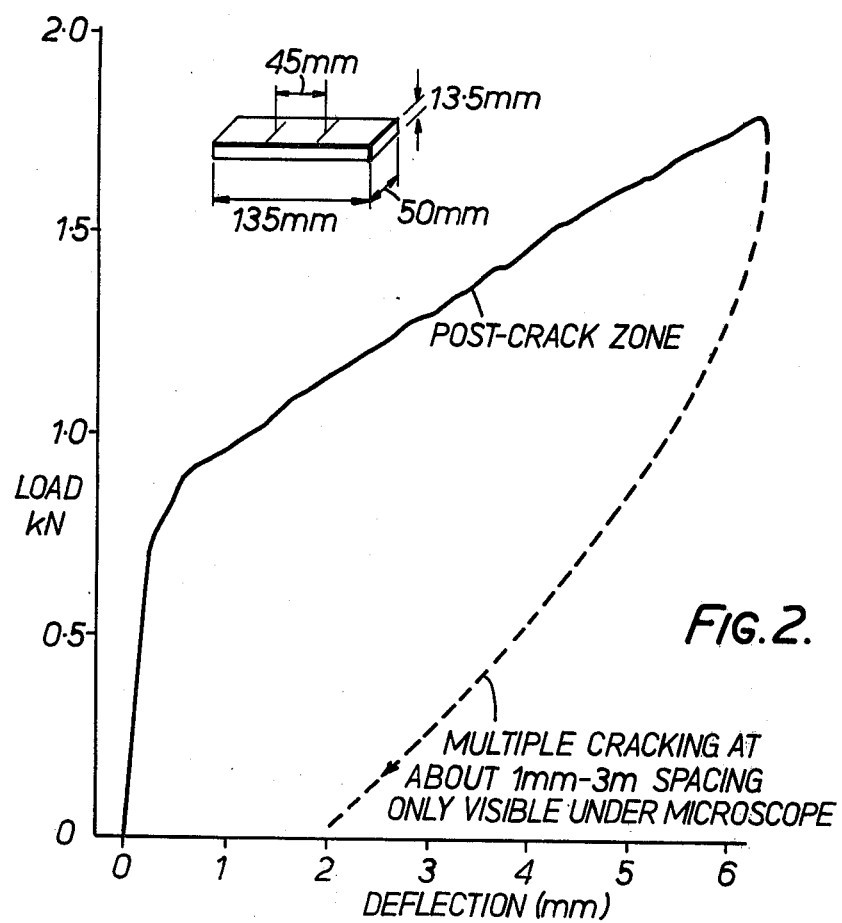
FIG. 2 is a graph plotting load in kN against deflection in mm, and showing as an inset the corresponding test specimen containing networks of non-woven fibrillated film.

In FIG. 2, at the point of load removal, the modulus of rupture calculated in the conventional manner on an elastic analysis was about 27 MN/m$^2$ but the maximum load had not been reached. Other similar specimens have achieved modulii of rupture in excess of 30 MN/m$^2$. In FIG. 2, 1 kN = 14.8 MN/m$^2$ modulus of rupture.

EXAMPLE 2

Although it is preferable to have a volume of reinforcing elements in excess of 5%, it is also possible in accordance with the invention to achieve multiple-cracking in tension and in flexure and increase in bending strength with lower volumes of continuous, flat, non-woven, networks.

Figure 3:
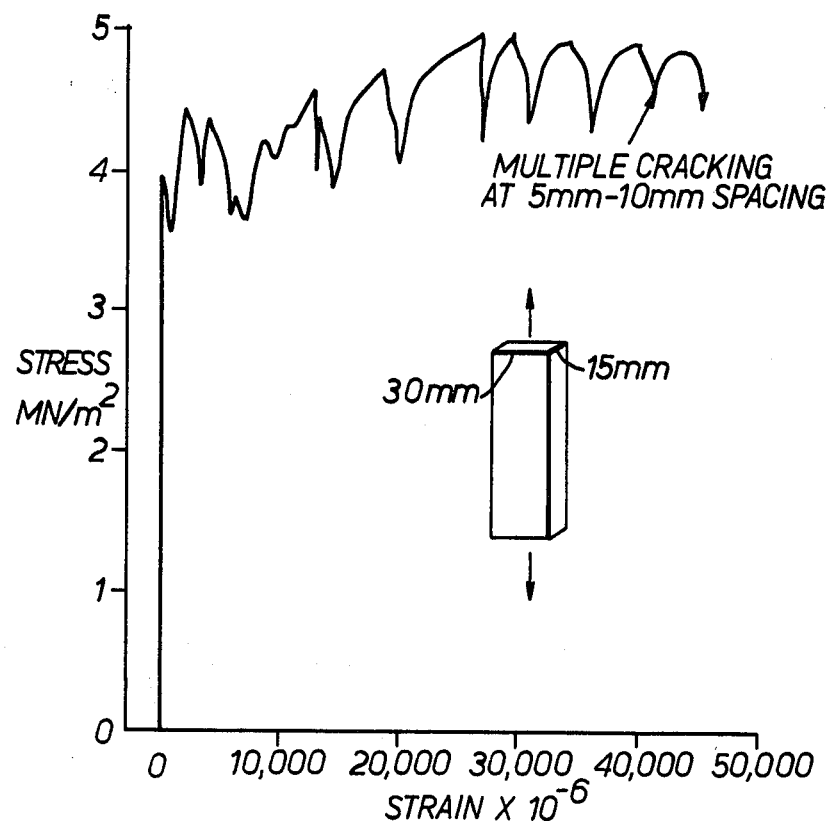
FIG. 3 is a graph plotting stress in MN/m$^2$ against strain $\times 10^{-6}$ for a further test specimen shown as an inset containing non-woven polypropylene fibrillated film.

A tensile load specimen (FIG. 3) was made employing the water-hardening mass of Example 1 with 324 layers of a flat opened network of non-woven polypropylene fibrillated film. The thickness of each film was at the lower end of the thickness range. The specimen was rectangular in section with dimensions 15 mm $\times$ 30 mm $\times$ 280 mm and there were therefore about 22 layers of film per mm thickness. The total film volume was 2.3% of the overall volume of the specimen. The effective film volume in the direction of tensile stress is difficult to determine with flat, opened, networks but was probably between 1.5% and 2% in this Example. The specimen was then tested and the results are shown in FIG. 3. A considerable post-cracking ductility was made possible as in Example 1.

EXAMPLE 3

Figure 4:
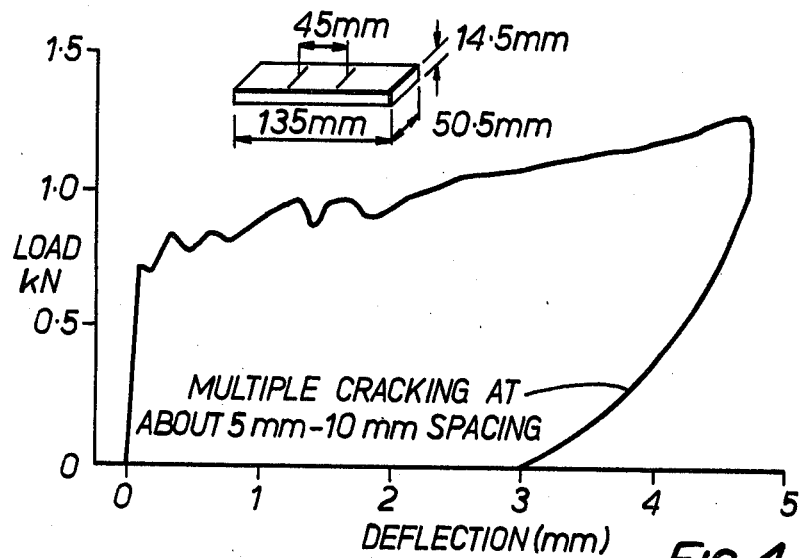
FIG. 4 is a graph plotting load in kN against deflection in mm. and showing as an inset the form and dimensions of a corresponding further test specimen of the same material as in FIG. 3.

A flexure load specimen was made of the same material described in Example 2. The specimen was rectangular with dimensions 14.5 mm $\times$ 50.5 mm $\times$ 150.00 mm. Tests over a span of 135.0 mm were carried out and the results are illustrated in the graph of load in kN against deflection of FIG. 4. The increase in load after cracking, was made possible by the post-cracking behavior described in Example 1. In this test the modulus of rupture is given by 1 kN = 12.7 MN/m$^2$.

EXAMPLE 4

In this Example a corrugated sheet was manufactured and the water-hardenable mass had a composition the same as that of Example 1.

Woven material (leno weave) was used as the reinforcement and was made of continuous orientated, fibrillated, polypropylene film with 3 mm. mesh and approximately two warps to one weft. Six layers of mesh were incorporated to give a thickness of 5.5 mm. Four layers were arranged with the warp parallel to the corrugations and two with the weft parallel to the corrugations.

The finished sheet 0.23 m × 1.1 m with a corrugation height of 20 mm. was tested in accordance with B.S. 690 Part 3, 1973, and sustained the required load of 334 Newtons. Cyclic loads were applied, initially up to 150 N, then 350 N, 400 N and finally at 800 Newtons. Three loading cycles were carried out at each load. At 150 N one or two minor cracks were formed: at 350 N crack spacing was 10 to 40 mm; at 400 N the crack spacing was reduced and at 800 N there was substantial deflection and the crack spacing was in the range of 3 to 6 mm.

Long term loading tests on a similar sheet were carried out with sustained, uniformly-distributed, loads of 0.75 kN/m$^2$ for 27 days and 1.5 kN/m$^2$ for a further 33 days. The residual creep deflection after removal of the load was less than 2 mm. in a span of 0.93 m. The uniformly-distributed load was increased to 2 kN/m$^2$ at which point the load-deflection curve indicated that significant cracking had occurred. Further sustained loading at 0.75 kN/m$^2$ in the cracked state produced a creep deflection of 0.25 mm. in 30 days. The uniformly-distributed loads are those specified in B.S. 5249 Part 14 1975 for asbestos-cement sheet.

EXAMPLE 5

A tensile load specimen was made employing the mixture of Example 1 and 150 layers of woven polypropylene (Leno weave), the layers being subjected to pressure during build-up of the layers. 8% by volume of the specimen was taken up by the network.

Figure 5:
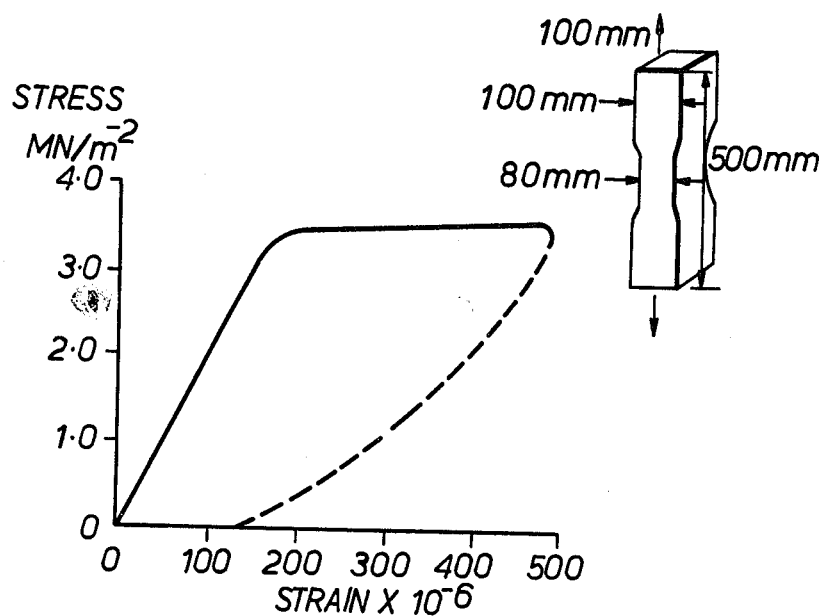
FIG. 5 is a graph plotting stress in MN/m$^2$ against strain $\times 10^{-6}$ at the initial cracking stage and showing as an inset the form and dimensions of a further test specimen containing woven polypropylene.
Figure 6:
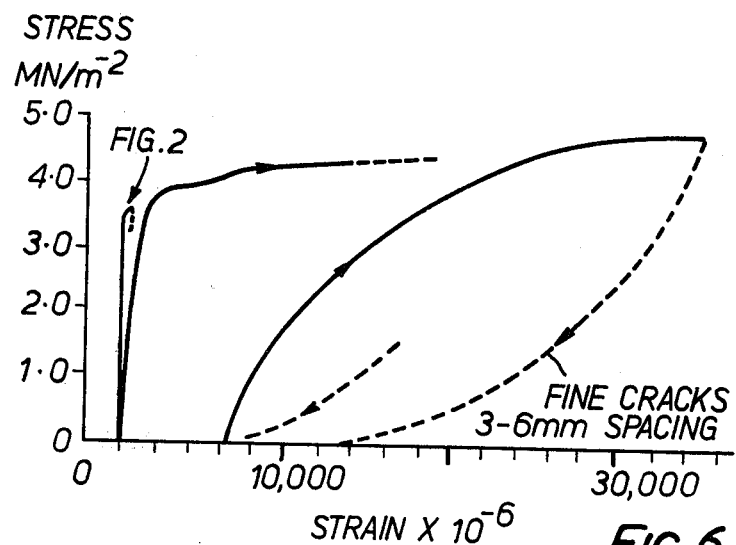
FIG. 6 is a graph plotting stress in MN/m$^2$ against strain $\times 10^{-6}$ illustrating post-cracking ductility for the test specimen shown in FIG. 5.

The specimen was then tested and the results attained are shown in FIGS. 5 and 6. In both Figures the stress in MN/m$^2$ is plotted against strain × 10$^{-6}$. In FIG. 5, the Initial Modulus E=21GN/m$^2$. FIG. 5 illustrates the initial cracking characteristics, while FIG. 6 illustrates the total curve showing post-cracking ductility. The left-hand curve of FIG. 6 is equivalent to FIG. 5 to a different scale.

EXAMPLE 6

A flexure load specimen was made employing the mixture of Example 1 and 100 layers of woven polypropylene were incorporated. The specimen was rectangular with dimensions 500 × 100 × 74.5 mm. The span during testing was 406 mm.

Figure 7:
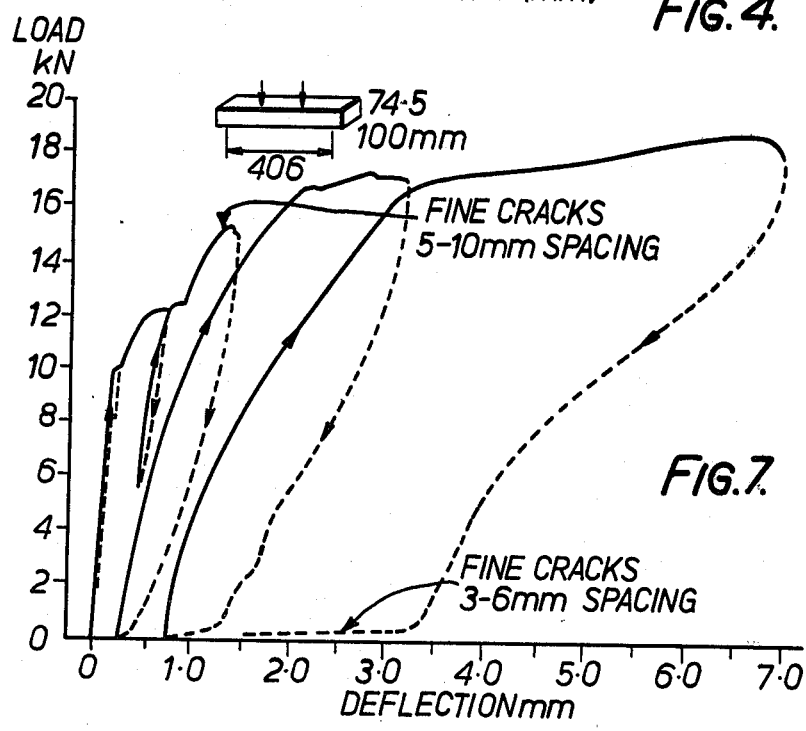
FIG. 7 is a graph plotting load in kN against deflection in mm. for a test specimen incorporating woven polypropylene fibrillated film.

Tests were carried out and the results are illustrated in FIG. 7 where the load in kN is plotted against deflection in mm. The modulus of rupture calculated in the conventional manner on an elastic analysis is expressed in this Figure as 10 kN=7.32 MN/m$^2$. As will be apparent the specimen was progressively loaded with higher and higher loads, a considerable increase in load carrying capacity being achieved after cracking had occurred.

EXAMPLE 7

A tensile load specimen was made with 40 layers of a flat opened network of non-woven polypropylene fibrillated film in a matrix of gypsum. The specimen was rectangular in section with dimensions 24.9 mm × 6.31 mm × 300.00 mm. The total film volume was 6.0% of the overall volume of the specimen. The following proportions by weight were chosen for the water-hardening mass: Gypsum 1.0: Total water 0.40: and set retarder (sodium citrate) 0.002.

Figure 8:
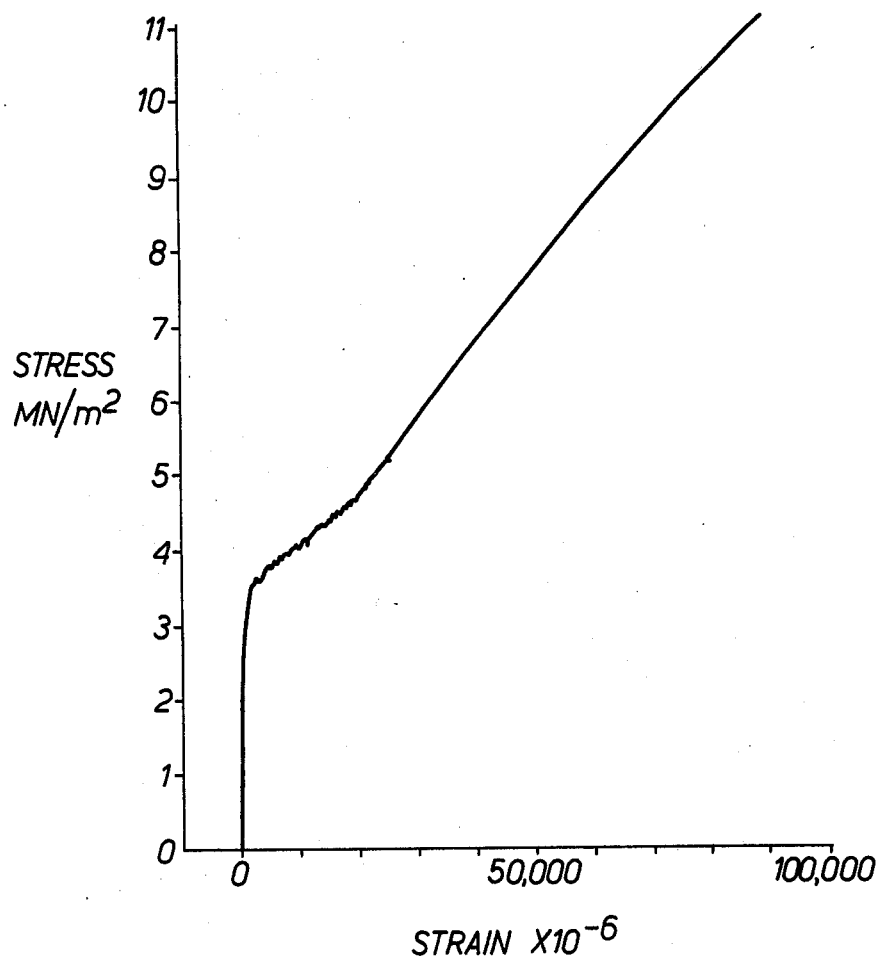
FIG. 8 is a graph plotting stress in MN/m$^2$ against strain $\times 10^{-6}$ of a composite incorporating networks on non-woven fibrillated film in a gypsum matrix.

The specimen was then tested and the results are displayed in the graph of stress in MN/m$^2$ plotted against strain × 10$^{-6}$ of FIG. 8. The considerable post-cracking ductility was made possible by interlocking of the continuous film network with the gypsum matrix and carrying the load, without pulling out, after cracking of the matrix had occurred. The final crack spacing was 2 mm.

EXAMPLE 8

Figure 9:
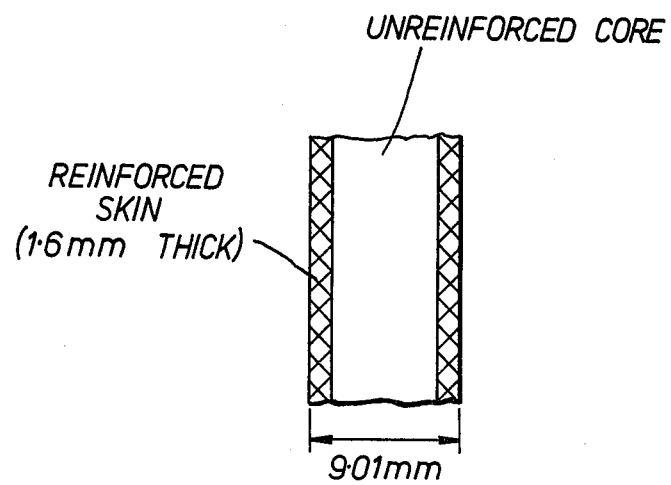
FIG. 9 is a further graph plotting stress in MN/m$^2$ against strain $\times 10^{-6}$ for a specimen of the kind illustrated in the fragmentary end view using gypsum as a matrix.
Figure 9:
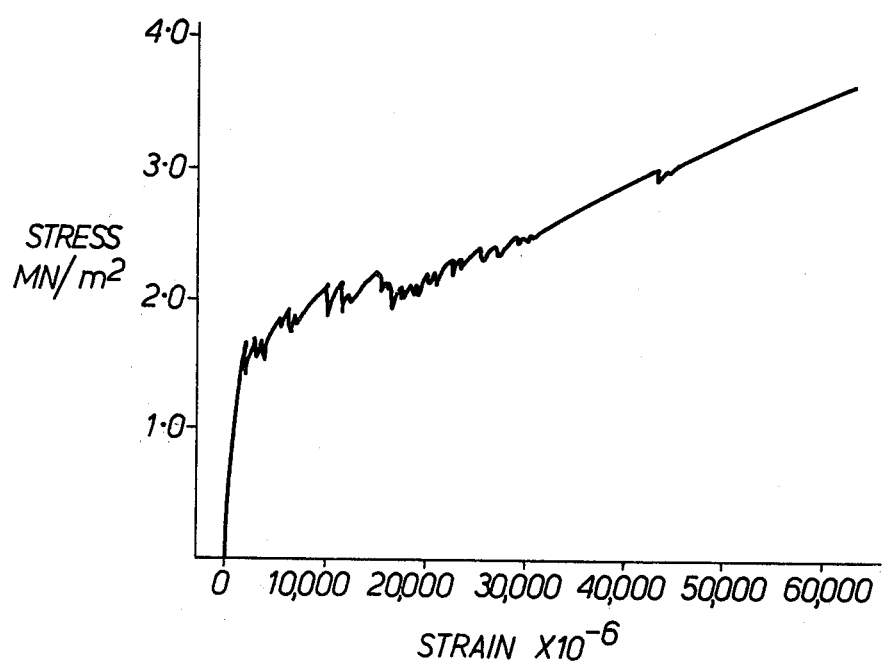

A tensile load specimen was made employing the mixture of Example 7. 10 layers of a flat opened network of non-woven polypropylene fibrillated film were concentrated on each of the two outer faces leaving an unreinforced core (FIG. 9). The total film volume was 2.7% of the overall volume of the specimen. However, the film volume of each of the reinforced skins—1.6 mm thick—was 6.0%. The specimen was rectangular in section with dimensions 23.1 mm × 9.01 mm × 300.00 mm.

The specimen was then tested and the results are displayed in the graph of stress in MN/m$^2$ (plotted against strain × 10$^{-6}$ of FIG. 9. The final crack spacing in the reinforced skin was 1.5 mm and in the unreinforced core was 7.0 mm. The considerable post-cracking ductility was made possible as described in Example 7.

EXAMPLE 9

A specimen length of fibrillated, high modulus, polyethylene ribbon was opened out laterally to form a network similar to that illustrated in FIG. 1 and incorporated as a multiplicity of layers in a matrix of cement, pulverized fuel ash, sand, water and MELMENT (Registered Trade Mark) in the proportions 1.0: 0.25: 0.19: 0.34: 0.025. MELMENT is a dispersing agent and is the Trade Mark for the dispersing agent referred to in Example 1. The action of such a dispersing agent is as hereinbefore described. The composite sheet was formed on a flat bed and owing to the "dead bend" characteristics of the polyethylene film it was not necessary to hold open the network layers during application of the plastic matrix of water-hardening mass.

Two different films were used, one, designated E15H having a far more fibrillated structure, than the other, E3H. There was a small difference in the tensile strengths of the two film types used. Both films were supplied by the Metal Box Company Limited of England. Several specimens were prepared in accordance with this procedure and the volume in this Example of 7.13% of reinforcing network for E3H and 7.4% for E15H. The former was smoother and had shorter slit length than the latter.

Tests were carried out on specimens up to strains of 5000 × 10$^{-6}$ and then unloaded. It was found that under these low strain conditions the performance of polyethylene was slightly better than polypropylene. The composite moduli and cracking strains were slightly higher than for polypropylene composites.

Figure 10:
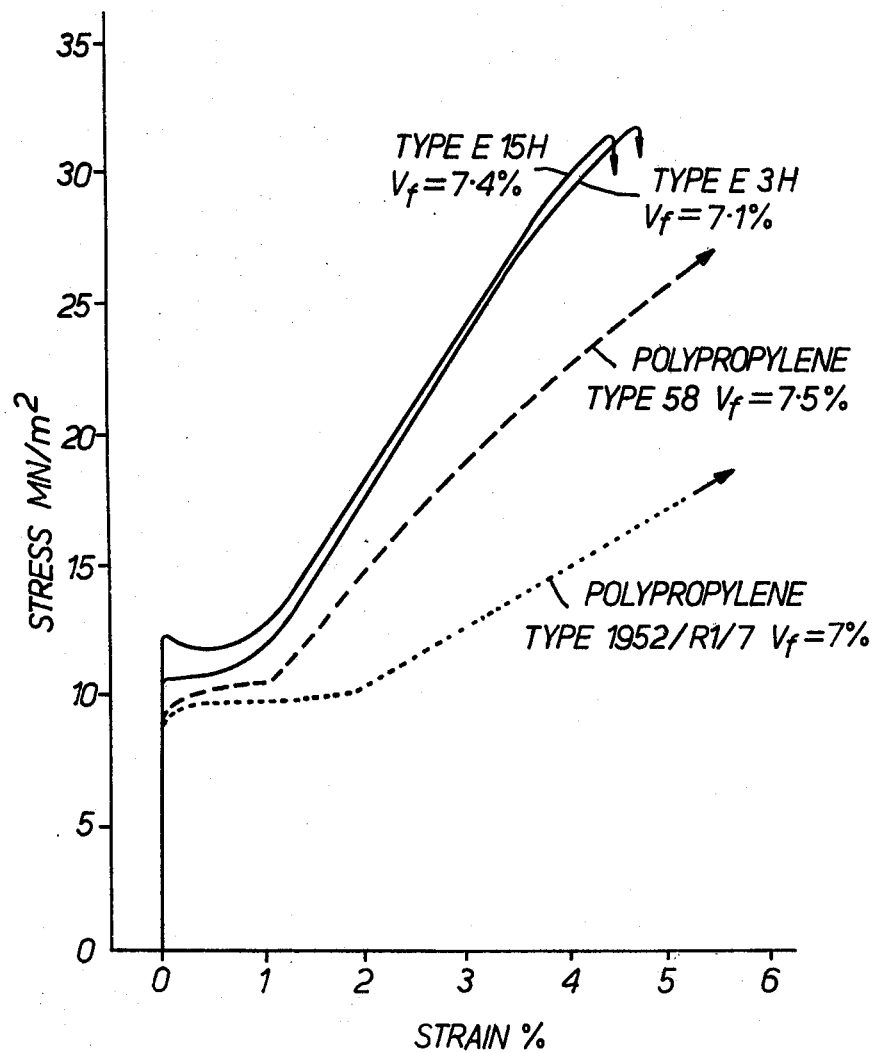
FIG. 10 is a graph plotting stress in MN/m$^2$ against strain for specimens incorporating networks of non-woven high modulus fibrillated polyethylene film as reinforcement.

FIG. 10 shows values obtained when specimens were tensile loaded to give much higher strains. The two films used of high modulus polyethylene gave basically a similar tensile performance, although E15H, exhibiting greater fibrillation, appeared to have a higher bend over point (i.e. the point in each stress/strain curve where there is the first major change in the slope) followed by a slight reduction in stress immediately after cracking. Both polyethylene films gave appreciably better performances than the two polypropylene film composites which have been shown in FIG. 10 for comparison purposes.

The crack spacing was found to be smaller for composites based on E15H films than for E3H films, the average spacing for E15H being 0.76 mm at 7.2% by volume and 1.54 mm at 7.1% by volume for E3H. This implies that the bonding for the more highly fibrillated film was better than for the less highly fibrillated film.

Figure 11:
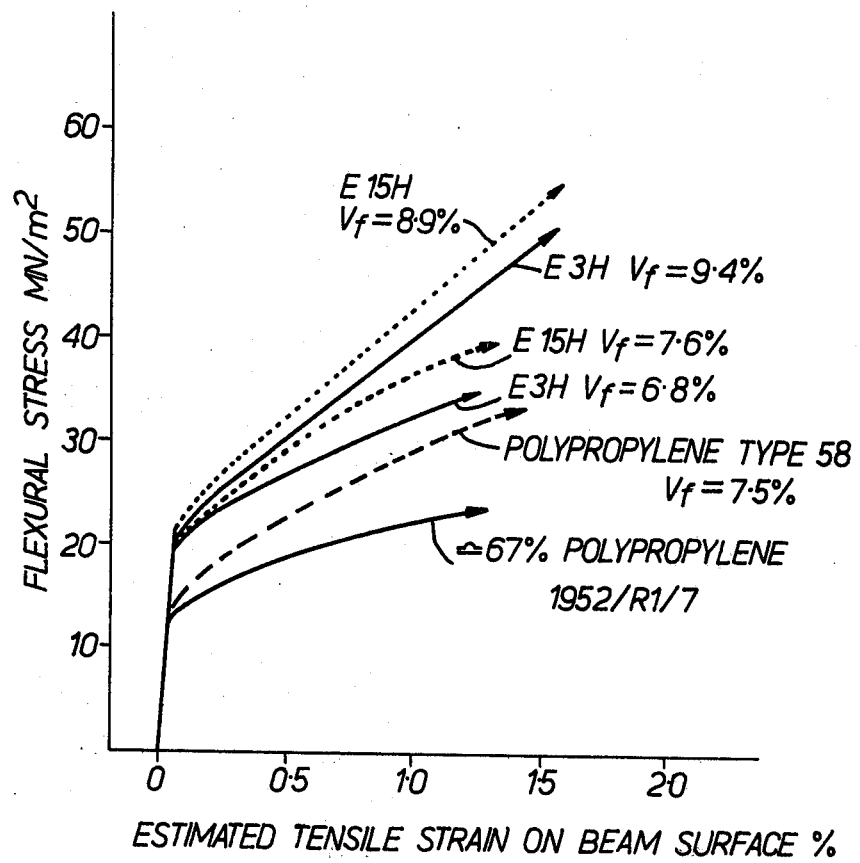
FIG. 11 is a graph plotting flexural stress in MN/m$^2$ against estimated tensile strain on a beam surface for specimens reinforced with networks of high modulus polyethylene film.

Flexural tests were also carried out on specimens made in accordance with this example and the test results are indicated in FIG. 11 which plots flexural stress in MN/m$^2$ against estimated tensile strain on beam surface in percent. The average values of the volume of reinforcement and the designation of the reinforcement are indicated against each curve. The considerable increase in the bend over point from approximately 12 MN/m$^2$ for polypropylene composites to approximately 20 MN/m$^2$ for the polyethylene may prove useful in practice by providing apparently uncracked composites under stresses encountered in use.

The estimated tensile strains ($\epsilon$) of FIG. 11 were obtained from the equation:

$$\epsilon = (108\, d.\delta A / 23 l^2)$$

where $\delta A = 1.15$ times third point deflection and d, l = depth and span of beam respectively.

The third point is one third of the distance between the support points of the specimen. The loads are applied at the third points.

Sheets made by the process in accordance with the invention are suitable for applications where asbestos-cement sheets have hitherto been used which are subjected to flexural loading and are liable to impact under certain conditions. It has been found that the sheets possess adequate toughness and a desirable pseudo-ductility, the latter phenomenon being attributable to multiple fine cracking, without however the bending strength of the material being adversely affected. An additional advantage is that nails may be driven directly through thin sheet without fracturing the sheet remote from the hole. The material is thus capable of high energy absorption during failure either under impact or under slowly increasing loads. In this respect therefore sheet material in accordance with the present invention presents an improvement over asbestos-cement which is liable to brittle fracture on impact. The ultimate strength of the sheet when subjected to direct tensile stresses is not likely to be increased in the same proportion as under flexural loading.

In the preferred construction with multiple layers of networks the risk of weak spots owing to absence of reinforcement are substantially eliminated. With the discontinuous fibres the risk of non-homogeneity is high.

The invention can be applied to corrugated, flat and asymmetric sheeting, troughs, non-pressure pipes, pressure pipes using high modulus polyethylene as reinforcement and rain-water articles such as are used in the house building and construction industry. It is also possible that the material produced by the method in accordance with the invention can be used to produce garden furniture, sewer linings, ventilation shafts, crash barriers, box sections and cladding panels incorporating expanded polystyrene. Alternatively the material may incorporate polystyrene beads to produce a lightweight insulating material.

The invention may additionally be applied to reinforced concrete and other structural members as a permanent shutter not for structural strength but rather to produce a fine surface crack pattern. This would enable higher stresses to be applied to the reinforcement in the beam before a limiting crack width is reached when compared with normal reinforced concrete.

Sheets in accordance with the invention are not merely substitutes for asbestos-cement sheets but are additionally suitable for end uses in internal and external applications not previously served by asbestos-cement.

I claim:

1. An article comprising a water-hardened mass and a continuous network of fabrillated film in the form of a plurality of layers embedded in the water-hardened mass, the volume of film amounting to more than 1½% by volume of the overall volume of the article and the fibrils of said film providing continuous mechanical and frictional bonding to reinforce the water-hardened mass so that under excess loading the article exhibits multiple fine cracks without rupture.

2. An article according to claim 1, wherein the network is a woven network.

3. An article according to claim 2, wherein the network is in the form of a weave with a doubled warp and a single weft so arranged that at each intersection the weft passes over one warp and beneath the other warp then the warps are twisted after insertion of the weft whereby to lock the weft in position.

4. An article according to claim 1, wherein said fibrillated film is polypropylene.

5. An article according to claim 1, wherein said water-hardened mass is cement and sand.

6. An article according to claim 1, wherein said water-hardened mass is gypsum.

7. An article according to claim 1, wherein the film is high modulus polyethylene which has been produced in such a way as to orientate the molecules and has been fibrillated.

8. An article according to claim 1, wherein the fibrillated film is derived from a polyolefin film which has been produced in such a way as to orientate the molecules and has been fibrillated.

9. An article according to claim 1, wherein the network is derived from a polypropylene film which has been produced in such a way as to orientate the molecules and has been fibrillated.

10. An article according to claim 1, wherein said fibrillated organic film is flat.

11. An article according to claim 1, wherein there are at least six layers of network.

12. An article according to claim 1, wherein the network comprises at least about 2% by volume of the article.

13. An article according to claim 1, wherein the network comprises at least about 5% by volume of the article.

14. An article comprising a water-hardened mass and a continuous network of fibrillated organic film in the form of a plurality of expanded, non-woven layers embedded within said mass, the fibrils of said film providing continuous mechanical and frictional bonding to reinforce the water-hardened mass so that under excess loading the article exhibits multiple fine cracks without rupture.

15. An article according to claim 14, wherein the fibrillated organic film is derived from a polyolefin film which has been produced in such a way as to orientate the molecules and has been fibrillated.

16. An article according to claim 14, wherein the organic film is derived from a polypropylene film which has been produced in such a way as to orientate the molecules and has been fibrillated.

17. An article according to claim 14, wherein the film is high modulus polyethylene which has been produced in such a way as to orientate the molecules and has been fibillated.

18. An article according to claim 14, wherein said fibrillated organic film is flat.

19. An article according to claim 14, wherein there are at least six layers of network.

20. An article according to claim 14, wherein the network comprises at least about 1½% by volume of the article.

21. An article according to claim 14, wherein the network comprises at least about 2% by volume of the article.

22. An article according to claim 14, wherein the network comprises at least about 5% by volume of the article.

23. An article according to claim 14, wherein the water-hardened mass is cement and sand.

24. An article according to claim 14, wherein the water-hardened mass is gypsum.

25. An article comprising a water-hardened mass and a network of fibrillated, high modulus polyethylene film in the form of a plurality of layers embedded in the water-hardened mass, the volume of film amounting to more than 1% by volume of the overall volume of the article and the fibrils of said film providing continuous mechanical bonding to reinforce the water-hardened mass.

26. A process for the manufacture of articles comprising the steps of providing a supply of water-hardening material, providing a supply of layers of fibrillated organic film network and incorporating one said supply in the other without rotary mixing.

27. A process according to claim 26, wherein the network layers are obtained by expanding laterally fibrillated organic film.

28. A process according to claim 26, wherein the film is high modulus polyethylene which has been produced in such a way as to orientate the molecules and has been fibrillated.

29. A process according to claim 26, wherein the fibrillated organic film is a polyolefin film.

30. A process according to claim 26, wherein the fibrillated film is derived from polyolefin film which has been produced in such a way as to promote orientation of the molecular structure and the film, which is then in a state of imminent fibrillation, is fibrillated by further mechanical treatment.

31. A process according to claim 26, wherein the organic film is polypropylene.

32. A process according to claim 26, wherein the layers are subjected to mechanical action during the incorporation in the water-hardening mass.

33. A process according to claim 26, wherein each layer of the network is in the form of a weave with doubled warps and single wefts and is so woven that at each intersection the weft passes over one warp and beneath the other warp.

* * * * *